(12) United States Patent  (10) Patent No.: US 7,694,071 B1
Sidhu et al.  (45) Date of Patent: Apr. 6, 2010

(54) DISK DRIVES AND METHODS ALLOWING CONFIGURABLE ZONING

(75) Inventors: Jasbir Sidhu, San Jose, CA (US); Andrew Vogan, Aloha, OR (US)

(73) Assignee: Seagate Technology LLC, Scotts Valley, CA (US)

( * ) Notice: Subject to any disclaimer, the term of this patent is extended or adjusted under 35 U.S.C. 154(b) by 704 days.

(21) Appl. No.: 11/484,341

(22) Filed: Jul. 11, 2006

Related U.S. Application Data

(60) Provisional application No. 60/698,423, filed on Jul. 12, 2005.

(51) Int. Cl.
*G06F 12/00* (2006.01)
(52) U.S. Cl. .................................. 711/112; 711/114
(58) Field of Classification Search ................... 711/112
See application file for complete search history.

(56) References Cited

U.S. PATENT DOCUMENTS

| | | | |
|---|---|---|---|
| 6,069,758 A * | 5/2000 | Chung | 360/31 |
| 6,253,279 B1 * | 6/2001 | Ng | 711/107 |
| 6,434,087 B1 * | 8/2002 | Schell et al. | 369/13.02 |
| 6,553,455 B1 * | 4/2003 | Asano et al. | 711/111 |
| 6,747,934 B2 * | 6/2004 | Ichikawa et al. | 369/53.35 |
| 6,972,993 B2 * | 12/2005 | Conley et al. | 365/185.04 |
| 2005/0283570 A1 * | 12/2005 | Delahunt | 711/114 |

* cited by examiner

*Primary Examiner*—Hong Kim
*Assistant Examiner*—Ngoc V Dinh
(74) *Attorney, Agent, or Firm*—David K. Lucente

(57) ABSTRACT

A disk drive capable of being configured into a plurality of data storage zones, wherein some of the zones have different performance characteristics than other zones; a method for performing such a zoning configuration; and, a host device utilizing such a disk drive. The disk drive comprises a disk having a plurality of sectors for storing data, a head for reading and writing the data, and a disk drive controller for controlling the head, wherein the plurality of the sectors are organized into the plurality of zones. In one embodiment of the present invention, the performance characteristics of the zones are dictated by configuration settings in the disk drive controller. The configuration settings may include settings for a plurality of parameters. In some embodiments of the present invention, the plurality of parameters comprises a CCT (command completion time) parameter, a Write Verify parameter, a Write Continuous parameter, a Read Continuous parameter, and an Error Re-allocation parameter. In other embodiments of the present invention, the configuration settings may also include a group of addresses associated with each zone.

32 Claims, 5 Drawing Sheets

DISK DRIVES AND METHODS ALLOWING CONFIGURABLE ZONING

CROSS-REFERENCE TO RELATED PATENT APPLICATIONS

Embodiments of the present invention relate to U.S. Provisional Application Ser. No. 60/698,423, filed Jul. 12, 2005, entitled "LBA Range Configuration for Disk Drives", the contents of which are incorporated by reference herein and which is a basis for a claim of priority.

BACKGROUND OF THE INVENTION

1. Field of Invention

Embodiments of the present invention relate generally to disk drives capable of being configured into a plurality of data storage zones, wherein some of the zones have different performance characteristics compared to other zones, and methods to perform such zoning configuration.

2. Related Art

Disk drives are widely used in personal computers and other electronic devices for the storage of data. A disk drive typically comprises of one or more disks for the storage of data, one or more heads to read or write the data, and a controller for controlling the movement of the heads. Each disk is divided into sectors, and the sectors can be accessed using an addressing system such as CHS (cylinder-head-sector) or LBA (Logic Block Addressing). In a LBA disk drive, the physical address of each sector is mapped to a logical address.

Typically, disk drives are designed for computer applications where the integrity of the stored data is critical. If a disk drive encounters an error during a read or write operation, the disk drive performs a set of error recovery routines to recover the data. The performance of error recovery can take up to 30 seconds, during which the disk drive is not responsive to commands from the host device. When the disk drive is used in a personal computer, data integrity may be of the utmost importance, and the host device (e.g., the personal computer) may wait for the disk drive to complete its recovery operation.

Disk drives are also becoming increasing popular in other electronic devices, such as digital video recorders (DVR), set-top boxes, digital music players, and the like. In these applications, the data integrity is not as important as the data throughput rate. For example, in a DVR application, an error due to the reading of one block of data may only affect portions of one video frame, which is not noticeable to the end user when viewing the Audio\Video (A/V) data stream at a high frame rate such as 30 frames-per-second (fps). However, since the disk drive is primarily designed for maximum data-integrity protection, the disk drive still undergoes the error-recovery routines whenever it encounters an error, rendering the disk-drive inaccessible for a period of time. In a DVR application, this causes the A/V data stream to be disrupted for up to 30 seconds, during which the end user may see a frozen video screen or a blue screen. During the performance of the error recovery routines, the host device (such as the DVR) cannot do anything to interrupt the disk drive except to power off and back on the disk drive; and such a power reset can still take approximately 10-15 seconds. If the DVR is outputting a video, the video display can be interrupted for 10-30 seconds when the disk drive encounters an error. If the DVR is recording a video, approximately 10-30 seconds of the A/V data stream will be lost.

In addition, some DVR devices are capable of displaying and recording multiple A/V data streams simultaneously. For example, if a DVR is recording 3 A/V data streams and displaying 2 A/V data streams, whenever the disk drive encounters an error with one data stream, all 5 A/V data streams are affected for the 10-30 second period.

Furthermore, home electronic devices, such as DVRs, set-top boxes, digital music recorders, and the like, are typically placed in locations where the ambient temperature is relatively high, and are more prone to vibrations and movements. These factors increase the likelihood of read and write errors for disk drives, which could cause frequent interruptions to the operation of the host device.

Typically, host devices (such as DVRs) also use the disk drive to store critical files, such as firmware, system files, configuration settings, and the like. For these files, the reading and writing of data are not time sensitive, but the data integrity is critical. Therefore, if a disk drive is designed with only the data throughput rate in mind without performing error recovery routines when an error is encountered, the host device could potentially crash or freeze when encountering an error during the reading or writing of critical system files. A write error ignored by the disk drive when writing a critical system file could potentially cause irrecoverable damages to the host device.

In light of the above mentioned problems, there is a need for a disk drive with multiple zones having different performance characteristic for zones used to stored different types of data, with some zones optimized for maximum data throughput rate, and some zones optimized for maximum data integrity protection. Furthermore, it is preferable that the zones be configurable as to their storage capacity and read or write performance characteristics, such that the host device manufacturer or the end user can customize each zone in accordance with the storage and performance needs of the host device.

SUMMARY OF THE DISCLOSURE

Embodiments of the present invention relate generally to disk drives capable of being configured into a plurality of data storage zones, wherein some of the zones have different performance characteristics than other zones; methods for performing such zoning configurations; and host devices utilizing such disk drives.

A disk drive according to a general embodiment of the present invention comprises a disk having a plurality of sectors for storing data, a head for reading and writing the data, and a controller for controlling the head. Each sector on the disk has an address unique from all other sectors. The plurality of sectors are organized into a plurality of zones, wherein some of the zones have different performance characteristics compared to other zones. The performance characteristics may include, but are not limited to, characteristics relating to the length of time within which a command is executed, data verification after the completion of a command, recovery of errors, and reporting of errors.

In various embodiments, the disk drive further comprises a memory portion storing configuration settings, wherein the configuration settings comprise settings for a plurality of parameters associated with each of the zones. The configuration settings for the parameters control the performance characteristics of each zone.

In various embodiments, the plurality of parameters comprises a CCT (Command Completion Time) parameter. The CCT parameter indicates a time limit within which all read or write commands must be performed. If a command cannot be completed within the CCT time limit, the disk drive shall return an error message to the host device, either immediately or upon the completion of the rest of the command.

In various embodiments, the plurality of parameters comprises a Write Verify parameter. When the Write Verify parameter is enabled for a zone, the disk drive checks for a read verify error following the execution of a write command within that zone, and attempts to correct the read verify error upon encountering it. If the Write Verify parameter is disabled for a zone, the disk drive does not check for a read verify error following the execution of a write command within that zone.

In various embodiments, the plurality of parameters comprises a Write Continuous parameter. When the Write Continuous parameter is enabled for a zone, the disk drive continues the writing of data upon encountering a write error during the execution of a write command within that zone, and reports the error upon completion of the entire command. If the Write Continuous parameter is disabled for a zone, the disk drive aborts the write operation and reports a write error immediately upon encountering the write error when writing within that zone.

In various embodiments, the plurality of parameters further comprises a Read Continuous parameter. When the Read Continuous parameter is enabled in a zone, the disk drive continues the reading of data upon encountering a read error when reading data from the zone, and reports the error after the entire read command is complete. When the Read Continuous parameter is disabled in a zone, the disk drive aborts the read operation and reports the read error immediately upon encountering the read error when reading from that zone.

In various embodiments, the plurality of parameters comprises an Error Re-allocation parameter. When the Error Re-allocation parameter is enabled, the disk drive assigns data originally stored in a first sector where an error is found to a different sector upon encountering an error with the first sector. When the Error Re-allocation parameter is disabled, no such re-assignment is done. In some embodiments, when the Error Re-allocation parameter is enabled, the disk drive gives a host device external to the disk drive an option for the re-assignment of data when an error is encountered.

In various embodiments, the controller comprises a memory portion storing a firmware capable of executing a set of configuration commands, wherein the configuration commands can be executed to set or modify the parameters in the configuration settings of each zone. In some embodiments, a host device external to the disk drive sends the configuration commands to the disk drive to modify the configuration settings of a zone.

In various embodiments, the configuration settings also include a group of addresses associated with each zone. The group of addresses associated with a zone indicates the portion of the disk drive assigned to each zone, and thus corresponds to the storage capacity of each zone. In some embodiments, an external host device can modify the storage capacity of each zone by altering the group of addresses associated with each zone.

An electronic device according to yet another embodiment of the present invention comprises an input connector, an output connector, a host controller, and a disk drive according to the previously discussed general embodiment. In this electronic device, the input connector inputs a stream of audio or video (A/V) data, the disk drive stores the A/V data, the output connector outputs the A/V data, and the host controller controls the disk drive. As previously mentioned, the disk drive comprises a plurality of zones, wherein some of the zones have different performance characteristics than other zones.

A method for configuring a plurality of zones in a disk drive according to an embodiment of the present invention comprises arranging a plurality of sectors into a plurality of zones, and setting the configuration settings of each zone such that some zones have different performance characteristics than other zones. In this embodiment, the disk drive is provided with a disk having a plurality of sectors for storing data, a head for reading and writing the data, and a controller for controlling the head, wherein each sector has an address unique from all other sectors.

Therefore, embodiments of the present invention enable a manufacturer or an end user of a host device with a disk drive to configure the zones on the disk drive such that the different zones have different performance characteristics. As a result, some zones on a disk drive can be optimized for fast access speed with low error checking functions, while other zones can be configured for maximum data integrity protection.

DETAILED DESCRIPTION OF PREFERRED EMBODIMENTS

Figure 1:
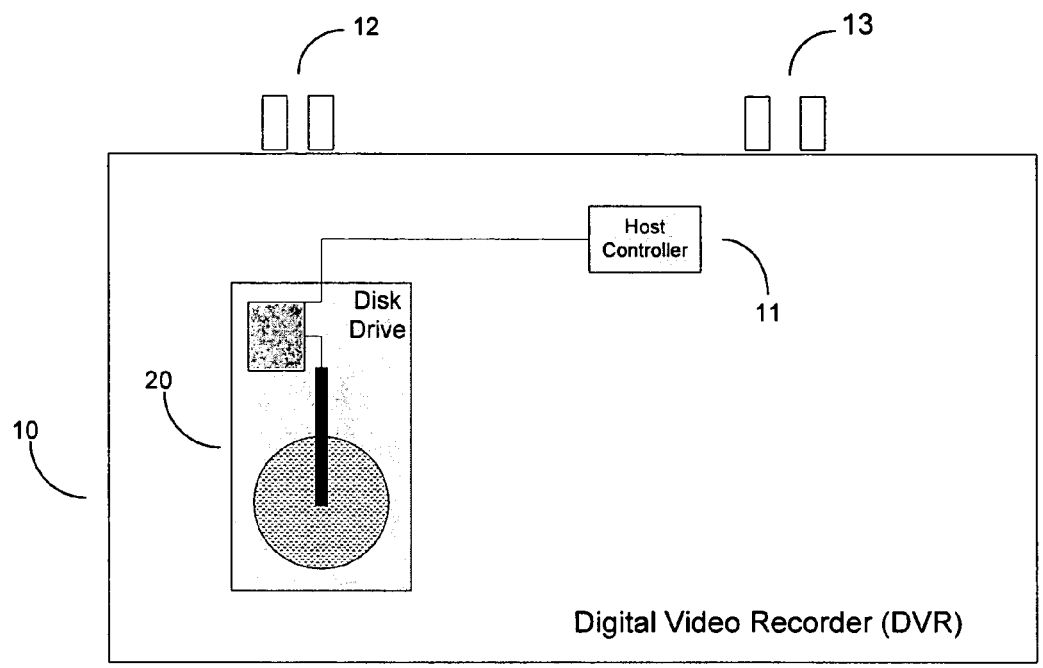
FIG. 1 illustrates the use of a disk drive in a host device such as a Digital Video Recorder (DVR) according to an embodiment of the present invention.

FIG. 1 illustrates the use of a disk drive 20 in a host device 10, such as a Digital Video Recorder (DVR) or the like, according to an embodiment of the present invention. The host device 10 comprises the disk drive 20, a host controller 11, an audio/video (A/V) input connector 12, and an A/V output connector 13.

Figure 2:
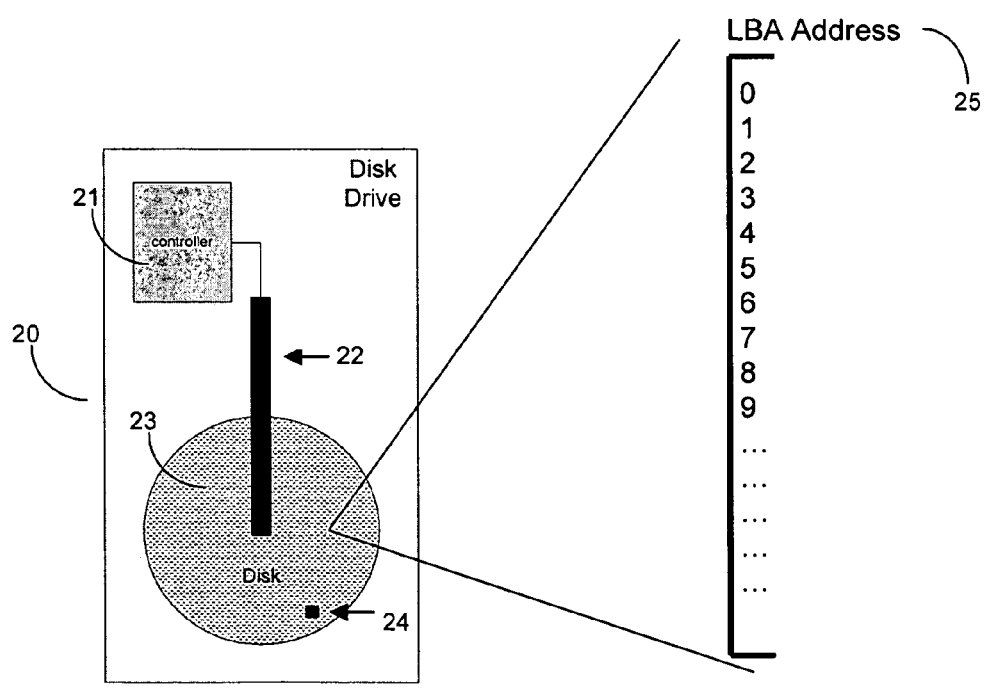
FIG. 2 illustrates key components of the disk drive according to an embodiment of the present invention.

FIG. 2 illustrates the key components of a disk drive 20 according to one preferred embodiment of the present invention. The disk drive 20 comprises a disk 23 having a plurality of sectors 24 for storing data, a head 22 for reading and writing the data, and a controller 21 for controlling the head 22. Each sector 24 has an unique address, such as a LBA (Logic Block Addressing) address 25. While the LBA addressing system is illustrated in this embodiment, other embodiments of the present invention could utilize other addressing systems.

Figure 3:
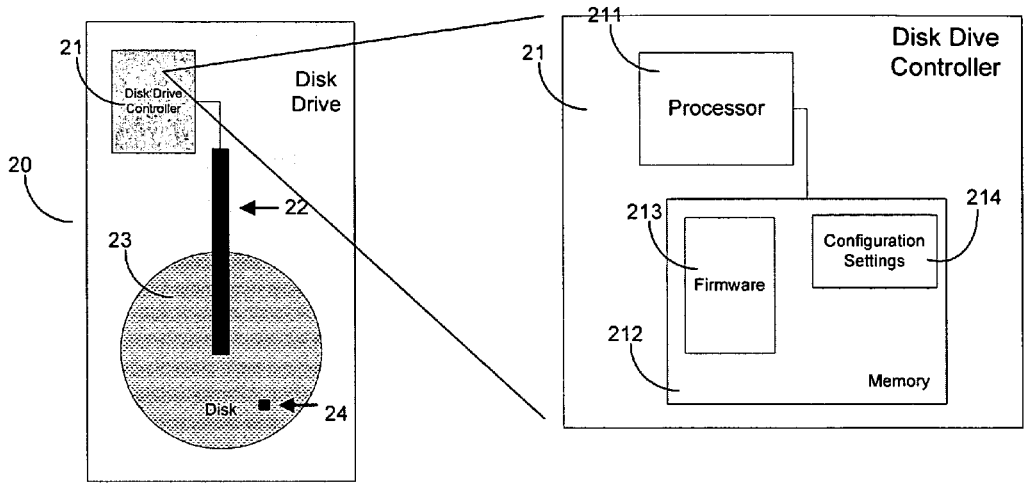
FIG. 3 illustrates a functional block diagram of a disk drive controller according to an embodiment of the present invention.

FIG. 3 illustrates a functional block diagram of the disk drive controller 21 as part of the disk drive 20, according to an embodiment of the present invention. The disk drive controller 21 comprises a processor 211 and a memory portion 212. The memory portion 212 stores the firmware 213 and configuration settings 214 for the disk drive 20. In other embodiments of the present invention, the configuration settings 214 can also be stored in a dedicated portion of the disk 23.

Figure 4:
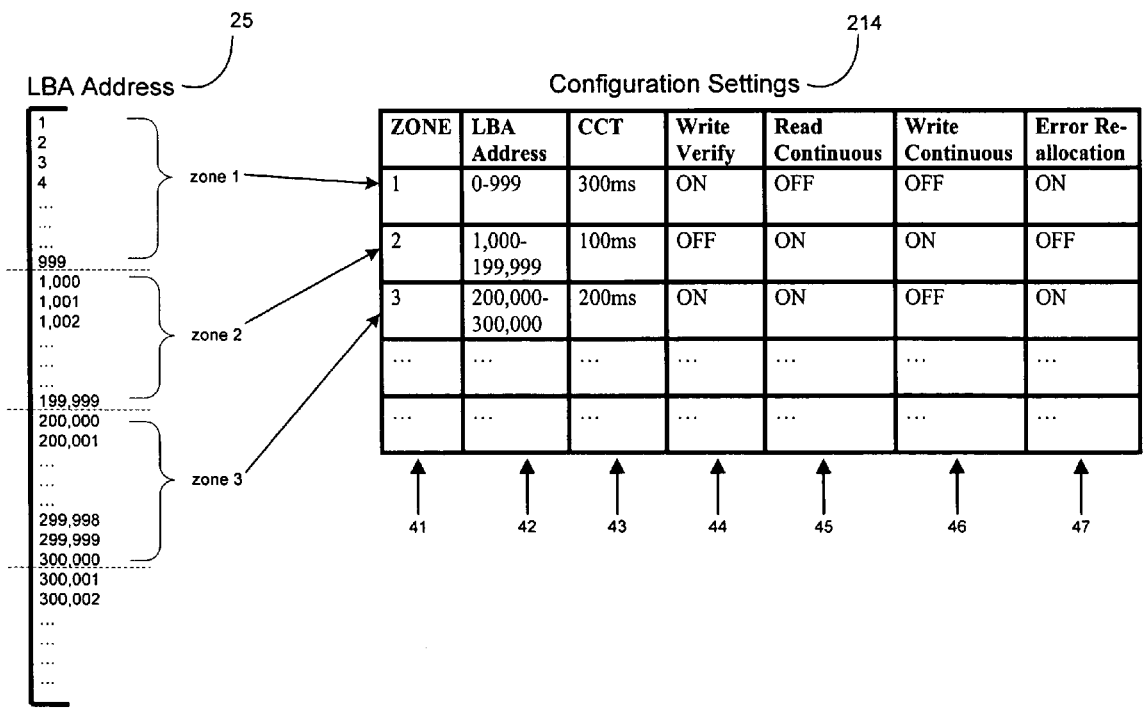
FIG. 4 illustrates configuration settings of a disk drive according to an embodiment of the present invention.

FIG. 4 illustrates the configuration settings 214 of a disk drive 20 according to an embodiment of the invention. The addresses 25 of the sectors 24 on the disk 23 are organized into a plurality of zones 41. In the configuration setting 214, each zone 41 is associated with a group of addresses 42, a CCT (command completion time) parameter 43, a Write Verify parameter 44, a Read Continuous parameter 45, a Write Continuous parameter 46, and an Error Re-allocation parameter 47. The group of addresses 42 defines the portion of the disk 23 assigned to each zone 41, and thus determines the storage capacity of each zone 41. The other parameters (43-47) determine the performance characteristics of each zone, which are discussed in more detail in the subsequent paragraphs.

The CCT parameter 43 determines a time limit within which read or write commands must be executed. During the execution of a read or a write command within a zone 41, if the time limit determined by the CCT parameter 43 is exceeded before the command completes satisfactorily, the disk drive 20 shall report an error to the host device 10. If a zone 41 is used for the storage of critical system files, and if the access speed of the system files is not critical, the CCT parameter 43 can be set to a relatively high number. Conversely, if a zone 41 is used to store data which needs to be accessed rapidly, such as audio/video data, the CCT parameter 43 can be set to a relatively small number. Typically, the CCT is on the order of milliseconds.

The Write Verify parameter 44 for each zone is set to either "enable" or "disable". If the Write Verify parameter 44 is set to "enable" for a zone 41, the disk drive 20 shall perform read verify for all data written within the zone 41; and, if an error is encountered during the writing, the disk drive 20 shall attempt to correct the error. If the correction cannot be completed within the time limit set by the CCT parameter 43, then the drive shall return an error message to the host device 10. If the Write Verify parameter 44 is set to "disable" for a zone 41, no verification is performed after the execution of a write command within that zone 41.

The Read Continuous parameter 45 for each zone 41 is set to either "enable" or "disable". If the Read Continuous parameter 45 for a zone 41 is set to "enable", the disk drive 20 shall return the best possible data within the time limit set by the CCT parameter 43 when reading data from a zone 41. If an error is encountered during the reading, the error shall not be reported to the host device 10 until the execution of the remaining portions of the read command is complete. If the Read Continuous parameter 45 is set to "disable", then the disk drive 20 shall abort the read command upon encountering an error and report the error immediately to the host device 10.

The Write Continuous parameter 46 for each zone 41 is set to either "enable" or "disable". If the Write Continuous parameter 46 for a zone 41 is set to "enable", the disk drive 20 shall write the best possible data within the time set by the CCT parameter 43 when writing data to a zone 41. If an error is encountered during the writing, the error shall not be reported to the host device 10 until the execution of the remaining portions of the write command is complete. If the Write Continuous parameter 46 is set to "disable", then the disk drive 20 shall abort the write command upon encountering an error and report the error immediately to the host device 10.

The Error Re-allocation parameter 47 for each zone 41 is set to either "enable" or "disable". If the Error Re-allocation parameter 47 for a zone 41 is set to "enable", when the disk drive 20 encounters an error during the execution of a command, the disk drive 20 copies the data in a defective sector 24 to a second sector 24. The disk drive 20 also assigns the address 25 previously associated with the defective sector to the second sector, and disassociates the defective sector from said address 25. Hence, the re-allocation of the defective sector can be transparent to the host device 10, since the data is still associated with the same address 25, although the address 25 is now associated with a different sector 24. If the Error Re-allocation parameter 47 for a zone 41 is set to "disable", then no such re-assignment occurs.

In some embodiments of the present invention, when the Error Re-allocation parameter is set to "enable", the disk drive 20 gives the host device 10 the option to decide whether to re-assign defective sectors or not; and if the host device 10 instructs the disk drive 20 to re-assign defective sectors, the disk drive 20 may exceed the CCT time limit in the re-allocation of a defective sector. In some embodiments of the present invention, when the Error Re-allocation parameter is set to "enable", the disk drive 20 automatically engages in the re-assignment of defective sectors.

In an example of Configuration Settings 214 provided in FIG. 4, zone 1 has a relatively high CCT parameter 42, the Write Verify 44 and Error Re-allocation 47 parameters are set to "enable", and the Read Continuous 45 and Write Continuous 46 parameters are set to "disable". In this example, the disk drive 20 shall verify all data written to the disk 23 within zone 1, immediately report all read and write errors upon occurrence, and re-assign data in defective sectors. Hence, a zone configured similar to zone 1 can be used to stored critical system files, since the access of system files is not usually time-sensitive.

In the example of FIG. 4, zone 2 has a low CCT parameter 43, enabled Read Continuous 45 and Write Continuous 46 parameters, and disabled Write Verify 44 and Error Re-allocation parameters 47. Hence, zone 2 can be used to store data such as audio or video data where occasional errors can be tolerated, but the read and write data throughput rate is critical.

In FIG. 4, zone 3 has the Write Verify 44, Read Continuous 45, and Error Re-allocation 47 parameters enabled, and Write Continuous 46 disabled; hence, zone 3 can be used to store data for which read errors can be tolerated but it is more critical to store the data correctly, such as the case for digital photography files. The execution of the read and write commands with respect to the configuration settings 214 are discussed in more detail below while referring to FIG. 6 and FIG. 7.

Figure 5:
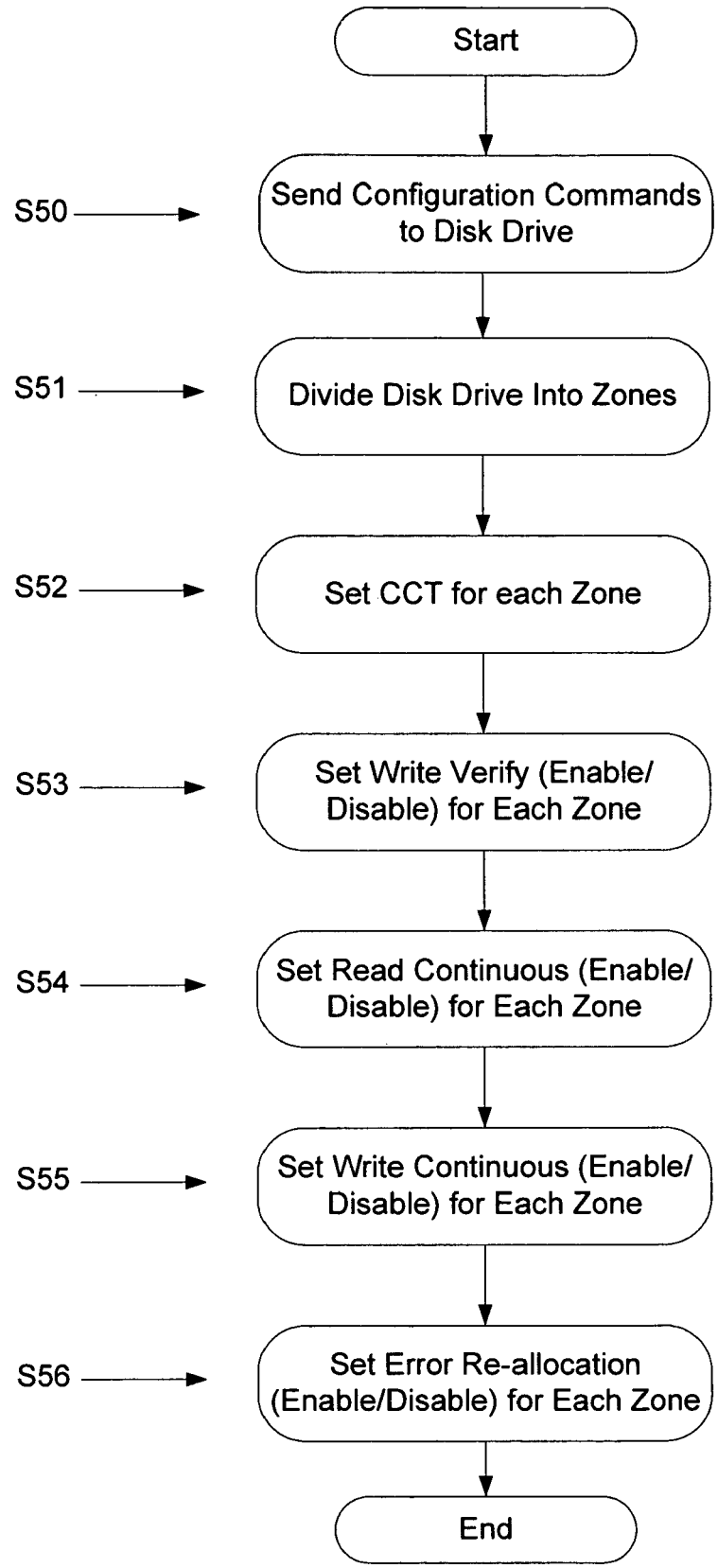
FIG. 5 is a flow chart illustrating an example of a process for setting configuration settings of a disk drive according to an embodiment of the present invention.

FIG. 5 is a flow chart illustrating a process for setting the configuration settings 214 of a disk drive 20 according to an embodiment of the present invention. In some embodiments of the present invention, this configuration process is completed by the manufacturer of the host device 20 prior to assembly of a disk drive 20 into a host device 10. In other embodiments, the host device 10 can set or modify the configuration settings of the disk drive 20 through the host controller 11. In either case, the firmware 213 within the disk drive controller 21 executes a set of configuration commands to set or modify the configuration settings 214. In step S50 of FIG. 5, the configuration commands are sent to the disk drive 20. In step S51, the disk drive is divided into a plurality of zones according to the configuration commands, wherein each zone is associated with a plurality of addresses 25 determining the storage capacity of the zone. Next, in step S52, the CCT parameter 43 is set for each zone. Next, in step S53, the Write Verify parameter 44 is set to "enable" or "disable" for each zone. Next, in step S54, the Read Continuous parameter 45 is set to "enable" or "disable" for each zone. Next, in step S55, the Write Continuous parameter 46 is set to "enable" or "disable" for each zone. Lastly, in step S56, the Error Re-allocation parameter 47 is set to "enable" or "disable" for each zone.

Figure 6:
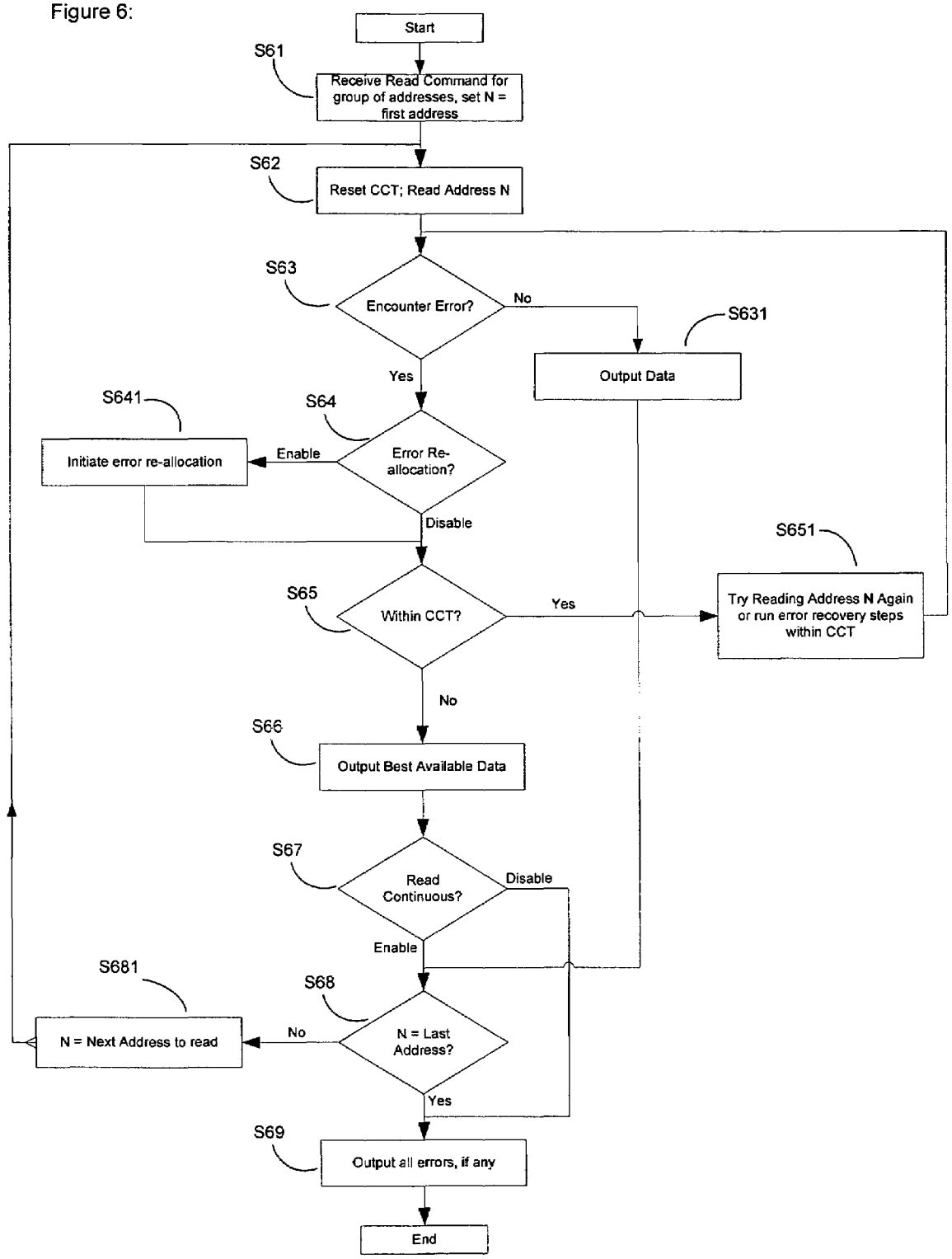
FIG. 6 is a flow chart illustrating an example of a process for executing a read command in a disk drive according to an embodiment of the present invention.

FIG. 6 illustrates an example of the execution of a read command according an embodiment of the present invention. In step S61, the disk drive 20 receives a read command from the host device 10 for a group of addresses. Next, in step S62, the disk drive 20 resets a counter for the CCT time limit and reads the first address of the read command. Subsequently, in step S63, the disk drive 20 determines whether an error is encountered during the reading of the address. If no error is encountered, the disk drive 20 outputs the data to the host device (S631), and proceeds to step S68 to check if the current address is the last address to be read. If the current address is the last address in the read command, the disk drive 20 proceeds to step S69 to output all errors if any (S69) to the host device 10 and completes the read operation; if the current address is not the last address (S68), the disk drive 20 proceeds to step S681 to advance to the next address to be read, and goes back to step S62 to read the next address.

In step S63, if an error is encountered, the disk drive next checks if the Error Re-allocation parameter is enabled in step S64; and if so, the disk drive 20 initiates the error re-allocation process (S641). The error re-allocation process assigns the data written in a sector 24 to a different sector 25, which may be executed automatically by the disk drive 20 or through instructions sent from the host device 10. If the Error Re-allocation parameter in step S64 is disabled, the disk drive next checks in step S65 whether the execution time is still within the allowed CCT time limit. If the CCT time limit is not exhausted, the disk drive 20 can try to read the address again in step S651 or exercise error recovery routines. The performance of error recovery routines depends on the time allowed by the CCT. When the disk drive 20 exercises the error recovery routines, it will exercise as much of the error recovery routines as allowable within the CCT time limit, in a predetermined order from most to least effective, until the error is recovered or the CCT time runs out, whichever comes first.

In step S65, if the disk drive 20 determines that the CCT time is exhausted, the disk drive 20 shall output the best available data (S66) read within the CCT time to the host device 20. Next, in step S67, the disk drive 20 checks whether the Read Continuous parameter is enabled. If Read Continuous is disabled, the disk drive 20 immediately outputs the read error to the host device 10 (S69) and terminates the execution of the read command. If Read Continuous is enabled, the disk drive 20 will advance onto the reading of the next address (S68 and S681), and outputs the error to the host device 10 (S69) after the reading of the remaining addresses received in the read command is complete.

Thus, in the flow illustrated by FIG. 6, when a zone is optimized for fast access, with a short CCT time, disabled error re-allocation, and enabled Read Continuous, the disk drive 20 shall attempt to read and output the best possible data within the time allowed by the CCT and does not interrupt the read process with error recovery, error re-allocation, or error reporting until the read command is complete. On the other hand, if a zone is optimized for data integrity, with a generous CCT time, enabled Error Re-allocation, and disabled Read Continuous, the disk drive shall attempt to recover or re-allocate all read errors and report all errors immediately upon occurrence to the host device 10.

Figure 7:
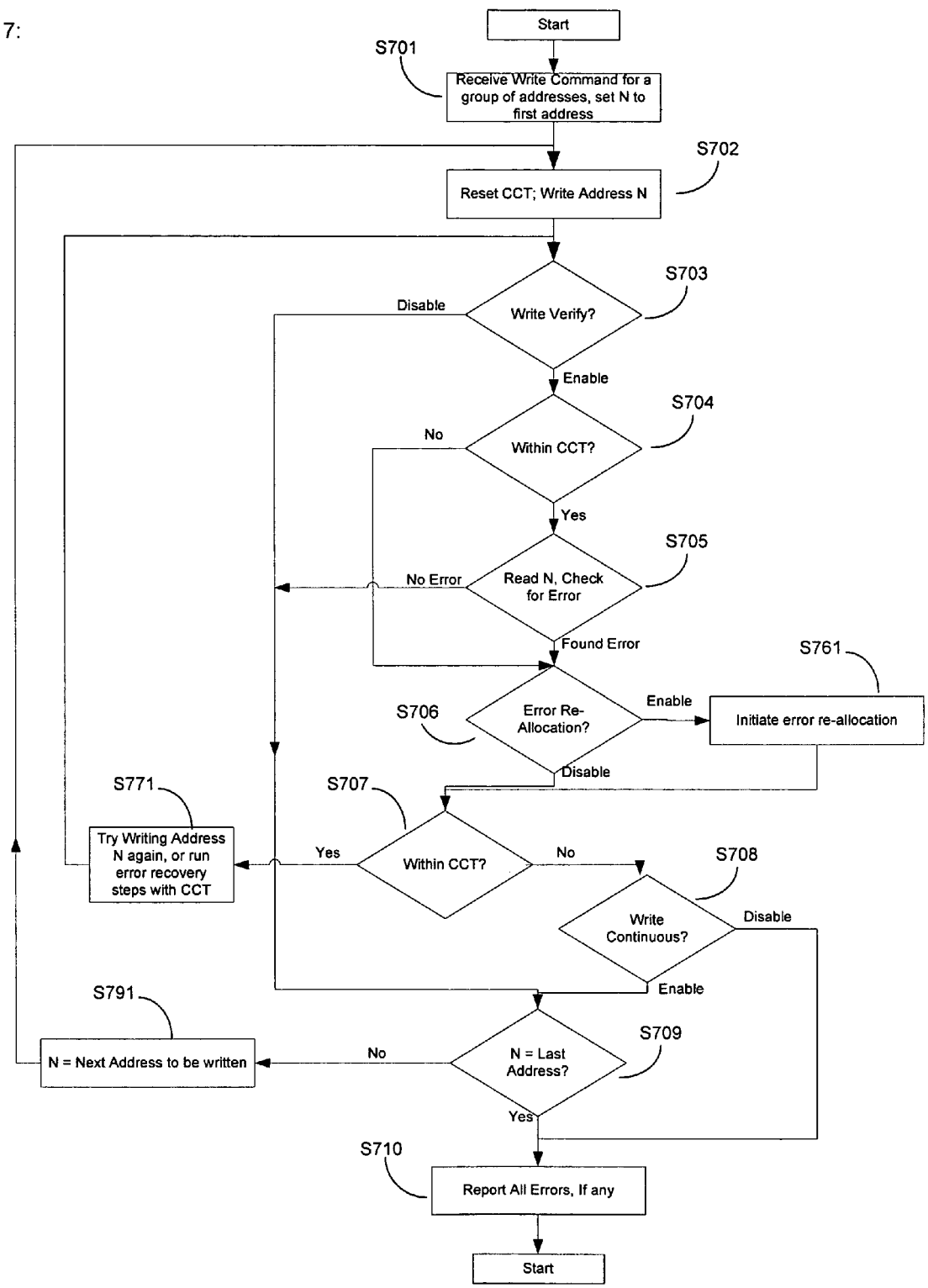
FIG. 7 is a flow chart illustrating an example of a process for executing a write command in a disk drive according to an embodiment of the present invention.

FIG. 7 illustrates an example of the execution of a write command according an embodiment of the present invention. First, in step S701, the disk drive 20 receives a write command for a group of addresses. Next, in step S702, the disk drive 20 writes to the first address of the group of addresses. Subsequently, in step S703, the disk drive 20 checks the setting of the Write Verify parameter. If Write Verify is disabled, the disk drive 20 checks if the current address is the last address to be written (S709). If the current address is not the last address to be written, the disk drive advances to the next address (S791) and writes the next address (S702); if the current address is the last address, the disk drive report errors if any (S710) and completes the process.

In step 703, if the Write Verify parameter is enabled, the disk drive 20 checks for the allowed CCT time limit (S704), and reads back the data written to check for errors (S705) if the CCT time is not exhausted. If no error is found in step S705, the disk drive 20 proceeds to step S709 to check if the current address is the last address to be written. If an error is found in step S705, the disk drive checks the setting of the Error Re-allocation parameter (S706). If Error Re-allocation is enabled, the disk drive 20 initiates error re-allocation; and if disabled, the disk drive proceeds to step S707 to check for allowed CCT time limit again.

At step S707, if the CCT time limit is not exhausted; the disk drive attempts to re-write the current address or exercise error recovery routines (S771), and again verify the re-written data if allowed within the CCT time limit (S703-S705). The performance of the error recovery routines in step S771 depends on the time allowed by the CCT. When performing error recovery, the disk drive 20 shall perform the steps in the error recovery routines in a predetermined order from most to least effective, until the error is recovered or until the CCT time limit is exhausted, whichever occurs first.

If the CCT time is exhausted at step S707, the disk drive 20 proceeds to the next step (S708) without attempting to re-write or recover the error. At step S708, the disk drive 20 checks the setting of the Write Continuous parameter. If Write Continuous is disabled, the disk drive 20 shall abort the write command and report the errors to the host device 10 (S710). If Write Continuous is enabled, the disk drive 20 shall advance to the next address to be written (S709 and S791), and report the error after the remaining addresses in the write command have been written.

Thus, in the flow illustrated by FIG. 7, when a zone is optimized for fast access, with a short CCT time limit, disabled Write Verify and Error Re-allocation, and enabled Write Continuous, the disk drive 20 shall attempt to write the best possible data within the time allowed by the CCT and does not interrupt the writing process with error checking, error re-allocation, or error reporting. On the other hand, if a zone is optimized for data integrity, with a generous CCT time, enabled Error Re-allocation and Write Verify, and disabled Write Continuous, the disk drive shall verify all data written, attempt to correct writing errors, and report errors immediately upon occurrence to the host device 10.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. For example, a host device of a digital video recorder is used as an example. However, the present invention can be used in any host device that utilizes disk drives for the storage of data. Moreover, the parameters of CCT, Write Verify, Read Continuous, Write Continuous, and Error Re-allocation are used to illustrate one method of controlling the performance characteristics of a plurality of zones on a disk drive. Other parameters that control similar or different functions can also be used. The scope of the invention is indicated by the attached claims, rather than the embodiments. Various modifications and changes that come within the meaning and range of equivalency of the claims are intended to be within the scope of the invention.

What is claimed is:

1. A disk drive, comprising:
   a disk having a plurality of sectors for storing data;
   a head for reading and writing the data;
   a controller for controlling the head; and
   a memory portion storing configuration settings,
   wherein the plurality of the sectors on the disk are organized into a plurality of zones, and
   wherein the configuration settings comprise a plurality of parameters selected from the group consisting of a Command Completion Time (CCT) parameter, a Write Verify parameter, a Write Continuous parameter, a Read Continuous parameter, and an Error Re-allocation parameter, and some of the plurality of zones have different configuration settings than other zones.

2. The disk drive of claim 1, wherein the plurality of parameters comprises a CCT parameter indicating a command completion time limit for each of the plurality of the zones.

3. The disk drive of claim 2, wherein when the disk drive encounters an error during an execution of a command, the disk drive executes a set of error recovery routines in a predetermined order, until the error is recovered or the command completion time indicated by the CCT parameter runs out, whichever occurs first.

4. The disk drive of claim 1, wherein the plurality of parameters comprises a Write Verify parameter for each of the plurality of the zones, wherein:
   when the Write Verify parameter is enabled, the disk drive checks for a read verify error following an execution of a write command, and
   when the Write Verify parameter is disabled, the disk drive does not check for the read verify error following the execution of the write command.

5. The disk drive of claim 1, wherein the plurality of parameters comprises a Write Continuous parameter for each of the plurality of the zones, wherein:
   when the Write Continuous parameter is enabled, the disk drive continues writing of the data upon encountering a write error during an execution of a write command, and reports the write error after the execution of the write command is complete, and
   when the Write Continuous parameter is disabled, the disk drive aborts the write command and reports the write error upon encountering the write error during the execution of the write command.

6. The disk drive of claim 1, wherein the plurality of parameters comprises a Read Continuous parameter for each of the plurality of the zones, wherein:
   when the Read Continuous parameter is enabled, the disk drive continues reading of the data upon encountering a read error during an execution of a read command, and reports the read error after the execution of the read command is complete, and
   when the Read Continuous parameter is disabled, the disk drive aborts the read command and reports the read error upon encountering the read error during the execution of the read command.

7. The disk drive of claim 1, wherein the plurality of parameters comprises an Error Re-allocation parameter for each of the plurality of the zones, wherein:
   when the Error Re-allocation parameter is enabled, the disk drive copies the data stored in a first sector to a second sector upon encountering an error when writing to or reading from the first sector, associates the second sector with an address originally associated with the first sector, and disassociates the first sector from said address, and when the Error Re-allocation parameter is disabled, the disk drive does not re-assign the data stored in the first sector upon encountering an error when writing to or reading from the first sector.

8. The disk drive of claim 7, wherein when the Error Re-allocation parameter is enabled, and when the disk drive encounters an error writing to or reading from the first sector, a host device external to the disk drive determines whether the disk drive does or does not re-assign the data from the first sector to the second sector.

9. The disk drive of claim 1, wherein the controller comprises a memory portion storing a firmware, wherein said firmware is capable of executing a set of configuration commands to set or modify the configuration settings of each of the plurality of the zones.

10. The disk drive of claim 9, wherein a host device external to the disk drive can modify the configuration settings of each of the plurality of zones by sending the configuration commands to the controller.

11. The disk drive of claim 1, wherein the configuration settings further comprises a group of addresses associated with each of the plurality of the zones.

12. The disk drive of claim 1, wherein said memory portion storing the configuration settings is located in the controller.

13. The disk drive of claim 1, wherein said memory portion storing the configuration settings is on the disk.

14. An electronic device, comprising:
    an input connector inputting an input stream of audio/video (A/V) signal;
    an output connector outputting an output stream of A/V signal;
    a disk drive for storing the A/V signal; and
    a host controller for controlling the disk drive,
    wherein the disk drive comprises a plurality of zones that have configuration settings include a plurality of parameters selected from the group consisting of a Command Completion Time (CCT) parameter, a Write Verify parameter, a Write Continuous parameter, a Read Continuous parameter, and an Error Re-allocation parameter, and some of the plurality of zones have different configuration settings than other zones.

15. The electronic device according to claim 14, wherein the disk drive further comprises:
    a disk drive controller capable of executing a set of configuration commands to modify the configuration settings of the each zone.

16. The electronic device according to claim 15, wherein the configuration settings comprises a set of unique addresses associated with each zone, wherein the set of unique addresses corresponds to a storage capacity for the each zone.

17. The electronic device according to claim 15, wherein the host controller is capable of sending the configuration commands to the drive controller to modify the configuration settings of the each zone or a storage capacity of the each zone.

18. The electronic device according to claim 15, wherein the plurality of parameters comprises a CCT parameter indicating a command completion time limit for each zone.

19. The electronic device according to claim 18, wherein when the disk drive encounters an error during an execution of a command, the disk drive executes a set of error recovery routines in a predetermined order, until the error is recovered or the command completion time indicated by the CCT parameter runs out, whichever occurs first.

20. The electronic device according to claim 15, wherein the plurality of parameters comprises a Write Verify parameter for each zone, wherein:
   when the Write Verify parameter is enabled, the disk drive checks for a read verify error following an execution of a write command, and
   when the Write Verify parameter if disabled, the disk drive does not check for the read verify error following the execution of the write command.

21. The electronic device according to claim 15, wherein the plurality of parameters comprises a Write Continuous parameter for each zone, wherein:
   when the Write Continuous parameter is enabled, the disk drive continues writing of the data upon encountering a write error during an execution of a write command, and reports the write error after the execution of the write command is complete, and
   when the Write Continuous parameter is disabled, the disk drive aborts the write command and reports the write error upon encountering the write error during the execution of the write command.

22. The electronic device according to claim 15, wherein the plurality of parameters comprises a Read Continuous parameter for each zone, wherein:
   when the Read Continuous parameter is enabled, the disk drive continues reading of the data upon encountering a read error during an execution of a read command, and reports the read error after the execution of the read command is complete, and
   when the Read Continuous parameter is disabled, the disk drive aborts the read command and reports the read error upon encountering the read error during the execution of the read command.

23. The electronic device according to claim 15, wherein the plurality of parameters comprises an Error Re-allocation parameter for each zone, wherein:
   when the Error Re-allocation parameter is enabled, the disk drive copies the data stored in a first sector to a second sector upon encountering an error when writing to or reading from the first sector, associates the second sector with an address originally associated with the first sector, and disassociates the first sector from said address, and
   when the Error Re-allocation parameter is disabled, the disk drive does not re-assign the data stored in the first sector upon encountering an error when writing to or reading from the first sector.

24. A method in a disk drive, the disk drive comprising a disk having a plurality of sectors for storing data, wherein each sector has an address unique from all other sectors; a head for reading and writing the data; and, a controller for controlling the head; the method comprising:
   arranging the plurality of sectors into a plurality of zones; and
   setting configuration settings for each of the plurality of zones,
   wherein setting the configuration settings comprises setting a plurality of parameters selected from the group consisting of a CCT parameter, a Write Verify parameter, a Write Continuous parameter, a Read Continuous parameter, and an Error Re-allocation parameter, and some of the plurality of zones have different configuration settings than other zones.

25. The method of claim 24, further comprising:
   providing a memory in the controller to store a firmware.

26. The method of claim 25, wherein the step-of-setting the plurality of parameters comprises setting a CCT parameter for each of the plurality of zones to determine a command completion time.

27. The method of claim 25, wherein setting the plurality of parameters comprises setting a Write Verify parameter for each of the plurality of zones, wherein:
   when the Write Verify parameter is enabled, the disk drive checks for a read verify error following an execution of a write command, and
   when the Write Verify parameter if disabled, the disk drive does not check for the read verify error following the execution of the write command.

28. The method of claim 25, wherein setting the plurality of parameters comprises setting a Write Continuous parameter for each of the plurality of zones, wherein:
   when the Write Continuous parameter is enabled, the disk drive continues writing of the data upon encountering a write error during an execution of a write command, and reports the write error after the execution of the write command is complete, and
   when the Write Continuous parameter is disabled, the disk drive aborts the write command and reports the write error upon encountering the write error during the execution of the write command.

29. The method of claim 25, wherein setting the plurality of parameters comprises setting a Read Continuous parameter for each of the plurality of zones, wherein:
   when the Read Continuous parameter is enabled, the disk drive continues reading of the data upon encountering a read error during an execution of a read command, and reports the read error after the execution of the read command is complete, and
   when the Read Continuous parameter is disabled, the disk drive aborts the read command and reports the read error upon encountering the read error during the execution of the read command.

30. The method of claim 25, wherein setting the plurality of parameters comprises setting an Error Re-allocation parameter for each of the plurality of zones, wherein:
   when the Error Re-allocation parameter is enabled, the disk drive copies the data stored in a first sector to a second sector upon encountering an error when writing to or reading from the first sector, associates the second sector with an address originally associated with the first sector, and disassociates the first sector from said address, and
   when the Error Re-allocation parameter is disabled, the disk drive does not re-assign the data stored in the first sector upon encountering an error when writing to or reading from the first sector.

31. The method of claim 25, wherein the firmware is capable of executing a set of configuration commands to set or modify the setting of the plurality of parameters.

32. The method of claim 31, further comprising receiving the configuration commands from a host device external to the disk drive instructing the disk drive for the setting of the plurality of parameters.

* * * * *